US012524857B2

(12) United States Patent
Oh et al.

(10) Patent No.: US 12,524,857 B2
(45) Date of Patent: Jan. 13, 2026

(54) METHOD AND APPARATUS FOR GENERATING 3D HDR RADIANCE FIELDS

(71) Applicant: POSTECH RESEARCH AND BUSINESS DEVELOPMENT FOUNDATION, Pohang-si (KR)

(72) Inventors: Tae Hyun Oh, Pohang-si (KR); Jun Seong Kim, Pohang-si (KR); Yu Ji Kim, Pohang-si (KR); Ye Bin Moon, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 126 days.

(21) Appl. No.: 18/503,784

(22) Filed: Nov. 7, 2023

(65) Prior Publication Data

US 2024/0212115 A1 Jun. 27, 2024

(30) Foreign Application Priority Data

Dec. 23, 2022 (KR) .................. 10-2022-0182909
Mar. 23, 2023 (KR) .................. 10-2023-0038100

(51) Int. Cl.
G06T 5/92 (2024.01)
G06T 15/06 (2011.01)
(Continued)

(52) U.S. Cl.
CPC .............. G06T 5/92 (2024.01); G06T 15/06 (2013.01); G06T 15/08 (2013.01); G06T 19/20 (2013.01);
(Continued)

(58) Field of Classification Search
CPC ........... G06T 19/20; G06T 5/92; G06T 17/00; G06T 15/08; G06T 15/06; G06T 5/60;
(Continued)

(56) References Cited

U.S. PATENT DOCUMENTS 12,243,095 B2 * 3/2025 Wang .................. G06V 20/64
2011/0188744 A1 * 8/2011 Sun ...................... G06T 5/94
382/162

(Continued)

OTHER PUBLICATIONS

Ben Mildenhall, Pratul P. Srinivasan, Matthew Tancik, Jonathan T. Barron, Ravi Ramamoorthi, and Ren Ng. 2021, "NeRF: representing scenes as neural radiance fields for view synthesis", Commun. ACM 65, 1 (Jan. 2022), 99-106. https://doi.org/10.1145/3503250.

(Continued)

*Primary Examiner* — Abderrahim Merouan
(74) *Attorney, Agent, or Firm* — Morgan, Lewis & Bockius LLP

(57) ABSTRACT

An image processing device may perform a method for generating 3D HDR radiance fields, and the method may include: receiving an input of low dynamic range (LDR) images, which are captured at various viewpoints; constructing the 3D high dynamic range (HDR) radiance fields from the LDR images captured at the various viewpoints; generating an HDR image by ray marching on a basis of the 3D HDR radiance fields; generating a tone-mapped LDR image from the HDR image through a tone mapping module; calculating a loss value on a basis of the LDR images captured at the various viewpoints and the tone-mapped LDR image; and modifying parameters of the 3D HDR radiance fields and parameters of the tone-mapping module, so as to maximally minimize the loss value. The LDR images captured at the various viewpoints may be images captured under photometric conditions different from each other.

19 Claims, 15 Drawing Sheets

(51) Int. Cl.
*G06T 15/08* (2011.01)
*G06T 19/20* (2011.01)

(52) U.S. Cl.
CPC .............. *G06T 2207/10024* (2013.01); *G06T 2207/20081* (2013.01); *G06T 2207/20084* (2013.01); *G06T 2207/20208* (2013.01); *G06T 2219/2012* (2013.01)

(58) Field of Classification Search
CPC . G06T 2207/20208; G06T 2207/20084; G06T 2207/20081; G06T 2207/10024; G06T 2219/2012
See application file for complete search history.

(56) References Cited

U.S. PATENT DOCUMENTS

| | | | | |
|---|---|---|---|---|
| 2013/0128027 | A1* | 5/2013 | Katsurada | H04N 23/741 348/125 |
| 2015/0187129 | A1* | 7/2015 | Sloan | G06T 15/60 345/426 |
| 2016/0322020 | A1* | 11/2016 | Park | G09G 3/3406 |
| 2020/0349711 | A1 | 11/2020 | Duke et al. | |
| 2020/0382728 | A1* | 12/2020 | Diasparra | H04N 25/589 |
| 2024/0070762 | A1* | 2/2024 | Wang | G06V 10/16 |
| 2024/0212115 | A1* | 6/2024 | Oh | G06T 19/20 |
| 2025/0037244 | A1* | 1/2025 | Mildenhall | G06T 5/60 |

OTHER PUBLICATIONS

Darius Rückert, Linus Franke, and Marc Stamminger, "ADOP: approximate differentiable one-pixel point rendering", ACM Trans. Graph. 41, 4, Article 99 (Jul. 2022), 14 pages. https://doi.org/10.1145/3528223.3530122.

Sara Fridovich-Keil, Alex Yu, Matthew Tancik, Qinhong Chen, Benjamin Recht, Angjoo Kanazawa; "Plenoxels: Radiance Fields Without Neural Networks", Proceedings of the IEEE/CVF Conference on Computer Vision and Pattern Recognition (CVPR), 2022, pp. 5501-5510.

Kim Jun-Seong, Kim Yu-Ji, Moon Ye-Bin, Tae-Hyun Oh, "HDR-Plenoxels: Self-Calibrating High Dynamic Range Radiance Fields", Computer Vision—ECCV 2022, 2022, vol. 13692, ISBN : 978-3-031-19823-6.

Ricardo Martin-Brualla, Noha Radwan, Mehdi S. M. Sajjadi, Jonathan T. Barron, Alexey Dosovitskiy, Daniel Duckworth; "NeRF in the Wild: Neural Radiance Fields for Unconstrained Photo Collections", Proceedings of the IEEE/ CVF Conference on Computer Vision and Pattern Recognition (CVPR), 2021, pp. 7210-7219.

Jaderberg, Max, et al., "Spatial transformer networks." Advances in neural information processing systems 28 (2015), pp. 1-15.

Kim, Seon Joo, et al. "A new in-camera imaging model for color computer vision and its application." IEEE Transactions on Pattern Analysis and Machine Intelligence 34.12 (2012): 2289-2302.

Debevec, Paul E., Camillo J. Taylor, and Jitendra Malik. "Modeling and rendering architecture from photographs: A hybrid geometry-and image-based approach." SIGGRAPH '96: In Proceedings of the 23rd annual conference on Computer graphics and interactive techniques, Aug. 1996, Association for Computing Machinery, New York, NY, USA, 11-20. https://doi.org/10.1145/237170.237191.

Huang, Xin, et al., "HDR-NeRF: High Dynamic Range Neural Radiance Fields," Proceedings of the IEEE/CVF Conference on Computer Vision and Pattern Recognition, 2022, pp. 18398-18408.

Yu, Alex, et al., "Plenoxels: Radiance Fields Without Neural Networks." CVPR, p. 1-10, Dec. 9, 2021.

Korean Office Action in KR 10-2023-0038100, dated May 16, 2024, 6 pages.

* cited by examiner

LDR images captured under
various photographing conditions
and at specific viewpoints 3D HDR radiance fields HDR & LDR images of
novel view

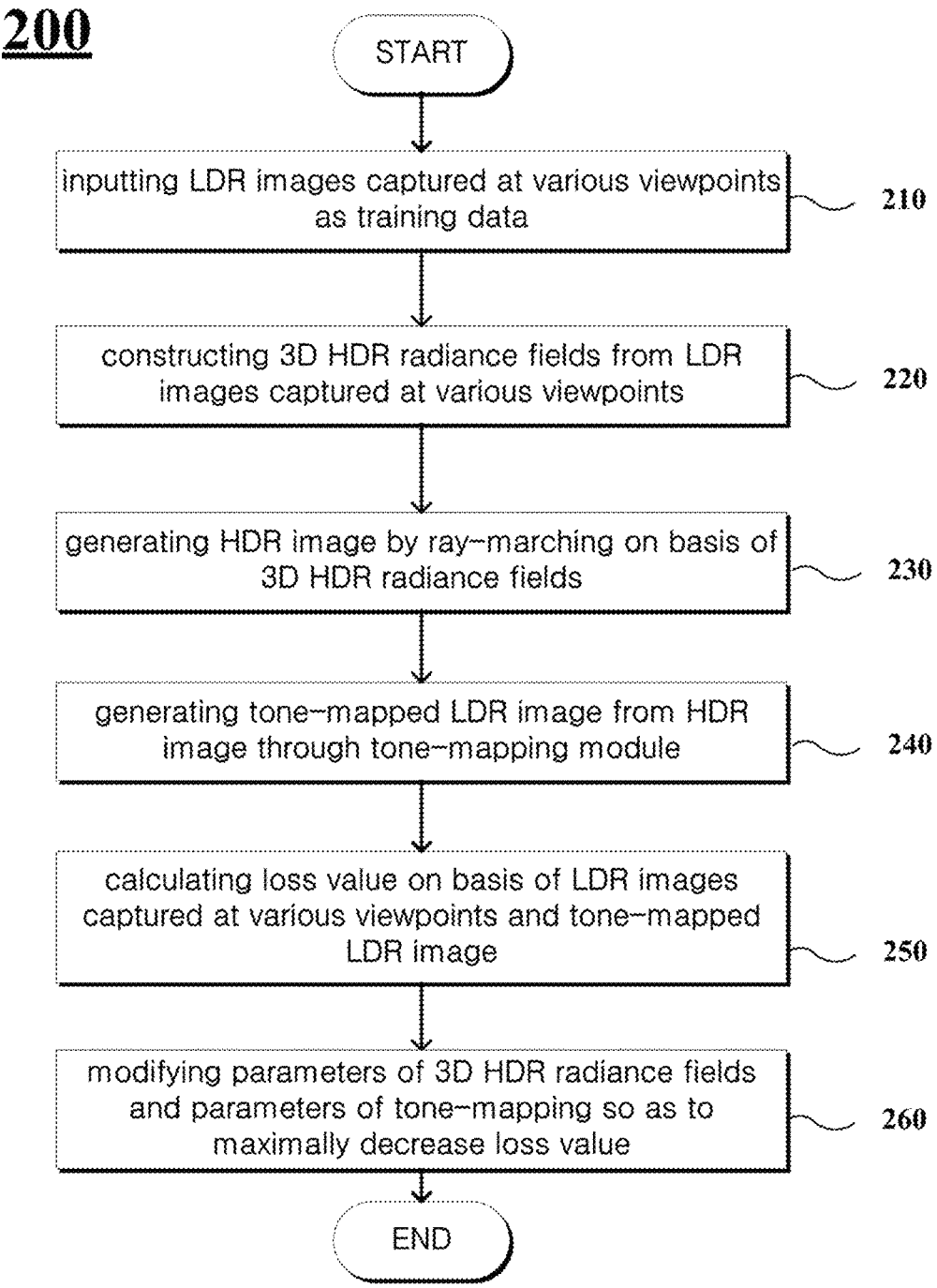

FIG. 8
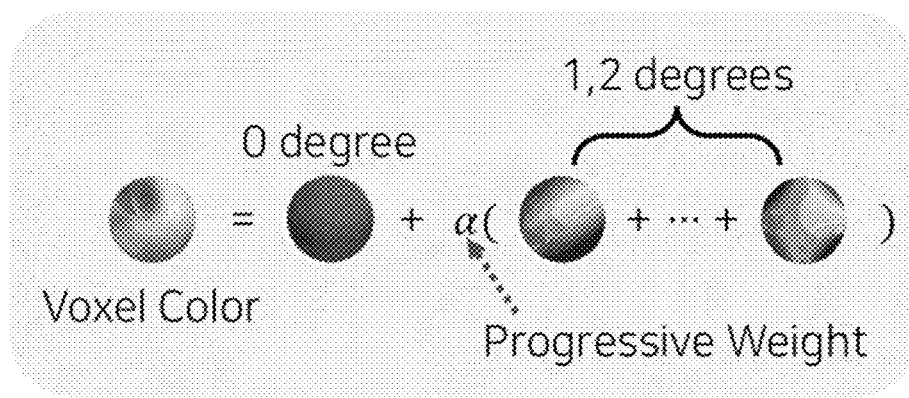
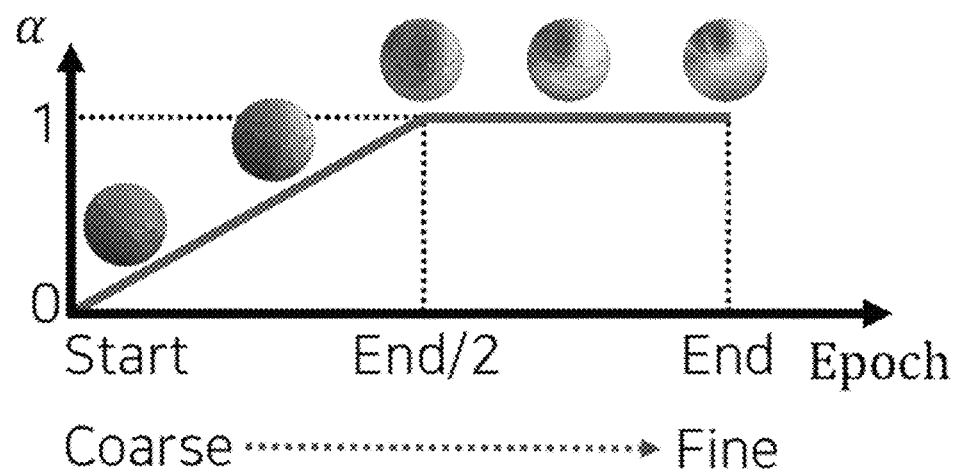

FIG. 14
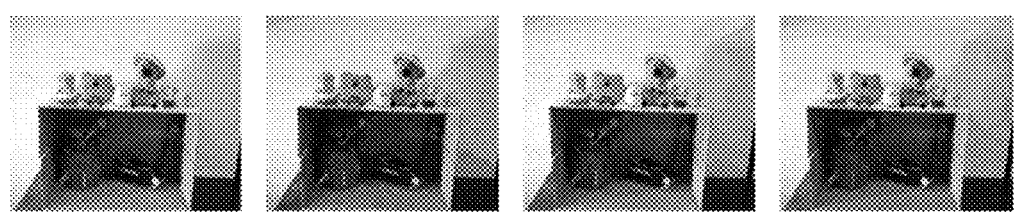
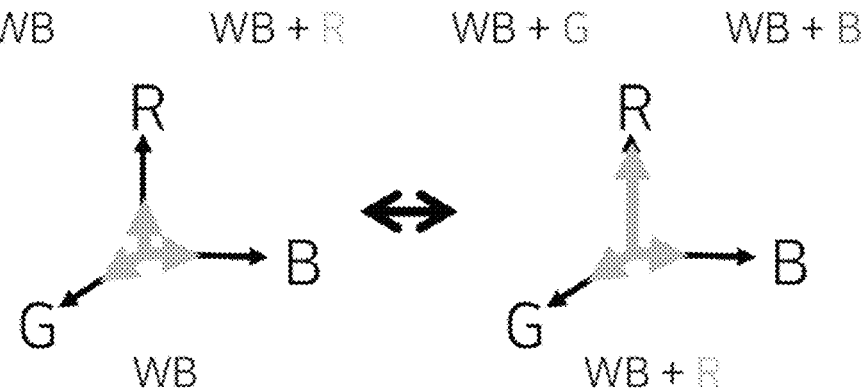

METHOD AND APPARATUS FOR GENERATING 3D HDR RADIANCE FIELDS

CROSS REFERENCE TO RELATED APPLICATION

The present application claims priority to Korean Patent Application No. 10-2022-0182909, filed Dec. 23, 2022, and No. 10-2023-0038100, filed Mar. 23, 2023, the entire contents of which are incorporated herein by reference for all purposes.

BACKGROUND OF THE INVENTION

Field of the Invention

The technology to be described below relates to a method and apparatus for generating three-dimensional (3D) high dynamic range (HDR) radiance fields.

Description of the Related Art

HDR is a technology for realizing an image of which the difference between a bright part and a dark part is maximally increased. HDR is used to more closely represent the light of a real world than in conventional rendering technologies. Conventionally, there has been a technology of restoring an HDR image by using images captured with various exposure values. The related art mainly restores the HDR image for one viewpoint or several given viewpoints.

A volume rendering technology is a technology of restoring and representing a 3D image from two-dimensional (2D) images. The volume rendering technology has recently used representation of voxels or a neural network. As a conventional volume rendering technology using voxels, there is Plenoxels introduced in "Plenoxels: Representing Scenes as Neural Radiance Fields for View Synthesis". In: IEEE Conference on Computer Vision and Pattern Recognition (CVPR) (2022). As a conventional volume rendering technology using a neural network, there is NeRF introduced in "NeRF in the Wild: Neural Radiance Fields for Unconstrained Photo Collections. In: IEEE Conference on Computer Vision and Pattern Recognition (CVPR) (2021)".

Documents of Related Art

Patent Document

US Patent Application Publication No. 2020-0349711

SUMMARY OF THE INVENTION

Conventional HDR imaging technologies merely attempt to restore an image for certain given viewpoints in two dimensions (2D). Accordingly, in the conventional HDR imaging technologies, there is difficulty in restoring an image for intermediate viewpoints that are not given.

The conventional 3D volume rendering technology does not consider photometric conditions such as exposure, white balance, and a camera response function for each picture. In other words, the conventional 3D volume rendering technology does not consider the photometric conditions that vary with each time photographing occurs in an actual photographing process.

In particular, although the conventional 3D volume rendering technology is capable of training viewpoint-dependent color changes, models are designed on the basis of an assumption that the changes according to viewpoints are not large. Accordingly, in a case where a color change according to a viewpoint is rapid, incorrect 3D geometric information is learned, thereby causing a problem in that floating matter in the form of noise is generated in a 3D space.

The technology described below is a technology for solving the above problem of the related art. The technology described below provides a method for generating a 3D HDR image from LDR images captured at various viewpoints. The technology described below provide a method for restoring a 3D HDR image from LDR images captured at not only given viewpoints but also unseen view, which are also called novel view.

A method for generating 3D HDR radiance fields includes: receiving, by an image processing device, an input of low dynamic range (LDR) images, which are captured at various viewpoints; generating, by the image processing device, the three-dimensional (3D) high dynamic range (HDR) radiance fields from the LDR images captured at the various viewpoints; generating, by the image processing device, an HDR image by ray marching on a basis of the 3D HDR radiance fields; generating, by the image processing device, a tone-mapped LDR image from the HDR image through a tone mapping module; calculating, by the image processing device, a loss value on a basis of the LDR images captured at the various viewpoints and the tone-mapped LDR image; and modifying, by the image processing device, parameters of the 3D HDR radiance fields and parameters of the tone-mapping module, so as to maximally minimize the loss value.

Wherein the LDR images captured at the various viewpoints are images captured under photometric conditions different from each other.

Using the technology described below, an HDR image may be generated by using LDR images captured at various viewpoints and under varying photometric conditions. Using the technology described below, 3D HDR radiance fields may be constructed. Using the technology described below, an HDR image may be generated even for a novel view by using the 3D HDR radiance fields. Using the technology described below, LDR images may be generated on the basis of the generated HDR image.

BRIEF DESCRIPTION OF THE DRAWINGS

FIG. 5 is a flowchart 200 illustrating a process of generating the 3D HDR radiance fields by the image processing device.

FIG. 8 is a view illustrating a regularization process of a spherical harmonic function.

FIG. 14 is a view illustrating a process of adjusting rendering by freely adjusting white balance photometric condition through the tone mapping module presented in the technology described below.

DETAILED DESCRIPTION OF THE INVENTION

The technology described below may be applied with various changes and may have various exemplary embodiments. The drawings in the specification may describe particular embodiments of the technology described below. However, this is for explanation of the technology described below and is not intended to limit the technology described below to the particular embodiments. Therefore, it should be understood that all changes, equivalents, or substitutes included in the idea and technical scope of the technology described below are included in the technology described below.

In the terms used below, singular expressions should be understood to include plural expressions unless the context clearly interprets otherwise. It should be understood that the term "includes", "comprises", and the like mean that the described feature, number, step, operation, component, part, or combination thereof exists, but do not preclude possibilities of the presence or addition of one or more other features, numbers, steps, operations, components, parts, or combinations thereof.

Prior to a detailed description of the drawings, it should be clarified that the classification of components in the present specification is merely classifying the components by main function of each component. That is, it may be provided such that two or more components described below may be combined into one component, or one component may be divided into two or more components for each more subdivided function. Further, naturally, in addition to the dedicated main function, each component to be described below may additionally perform some or all of functions of other components, and a part of the main function of each component may also be exclusively performed by other components.

In addition, in performing a method or a method of operation, each process constituting the method may be performed in a different order from a specified order unless a particular order is clearly described in context. That is, each process may be performed in the same order as specified, may be performed substantially simultaneously, or may be performed in a reverse order.

First, problems of a conventional image processing device will be described.

Figure 1:
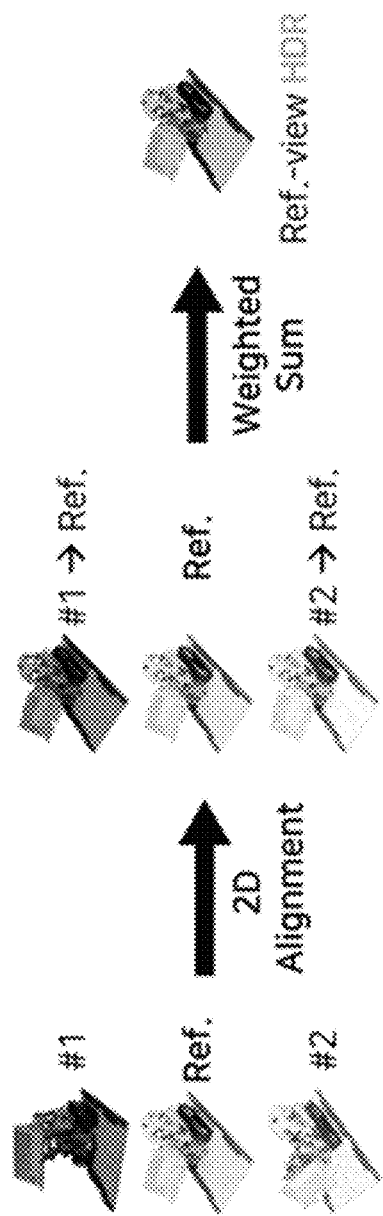
FIG. 1 is a view illustrating a process of constructing an HDR image by a conventional image processing device.

FIG. 1 is a view illustrating a process of constructing an HDR image in a conventional image processing device.

The conventional image processing device of FIG. 1 aligns images from different view having Exposure Value (or Contrasts) different from each other to one reference viewpoint (i.e., Ref in FIG. 1), assigns weights different from each other to the respective images according to the EV difference, and then add the weights to get a weighted sum, thereby proceeding with HDR restoration for one viewpoint.

Accordingly, the conventional image processing device of FIG. 1 has a problem in that an HDR image may be constructed merely from some given viewpoints.

Figure 2:
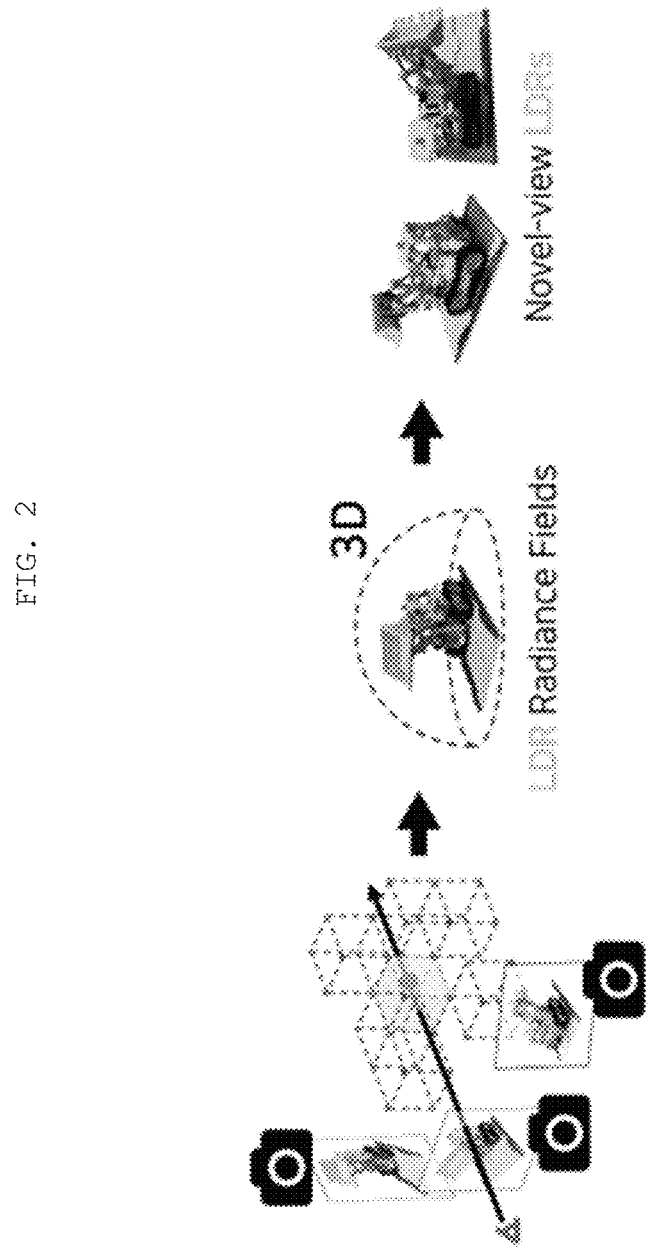
FIG. 2 is a view illustrating a process of generating 3D radiance fields by the conventional image processing device.

FIG. 2 is a view illustrating a process of generating three-dimensional (3D) radiance fields in the conventional image processing device.

The conventional image processing device of FIG. 2 generates the 3D radiance fields by using 2D images captured at various viewpoints with static photometry conditions.

The conventional image processing device of FIG. 2 has a strong point of enabling generation of an image for a novel view by using the 3D radiance fields.

However, the conventional image processing device of FIG. 2 has a problem in that performance is greatly deteriorated in a case where photometric conditions of an input images are changed.

For example, in a case where exposure, white balance, or a camera response function of each of images captured from the front and the side is changed, the conventional image processing device of FIG. 2 has a problem in that 3D radiance fields are not generated well and rendering performance is significantly deteriorated.

The technology described below is a technology for solving the problems of the conventional image processing device.

Figure 3:
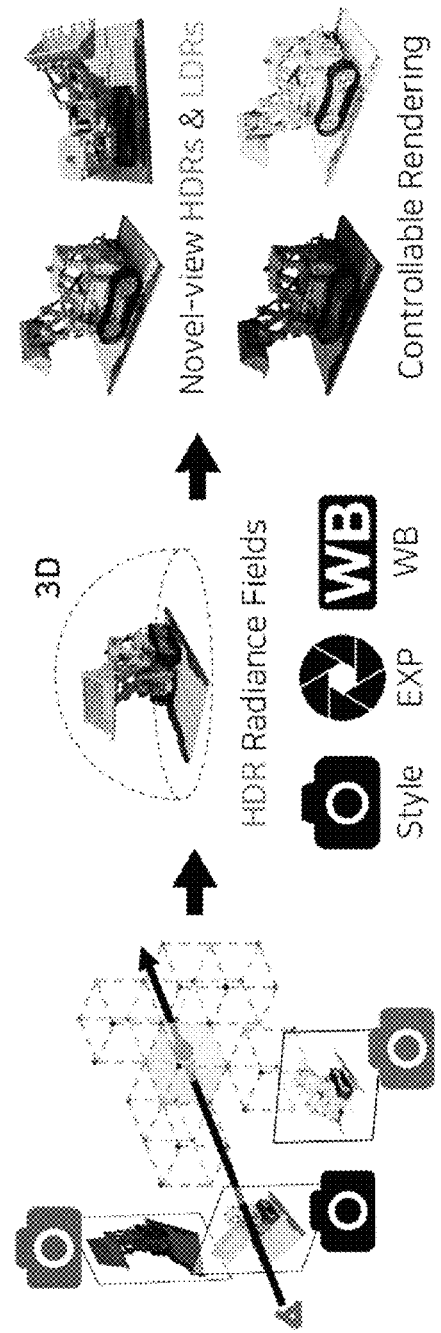
FIG. 3 is a view illustrating a method for generating 3D HDR radiance fields, the method being proposed in a technology described below.

FIG. 3 shows the technology described below.

The technology described below generates 3D HDR radiance fields by using LDR images captured under varying photometric conditions. From a novel view using the generated 3D HDR radiance fields, the technology described below may generate an HDR image and LDR images.

That is, the technology described below is a technology for solving the problem that the conventional image processing device of FIG. 1 does not operate for a novel view that is not given when an HDR image is constructed. In addition, the technology described below is a technology to solve the problem of performance deterioration when photometric conditions are changed in a 3D volume rendering process of FIG. 2.

Hereinafter, an overall process of generating 3D HDR radiance fields by the image processing device and generating an HDR image or LDR images by using the generated 3D HDR radiance fields will be described.

Figure 4A:
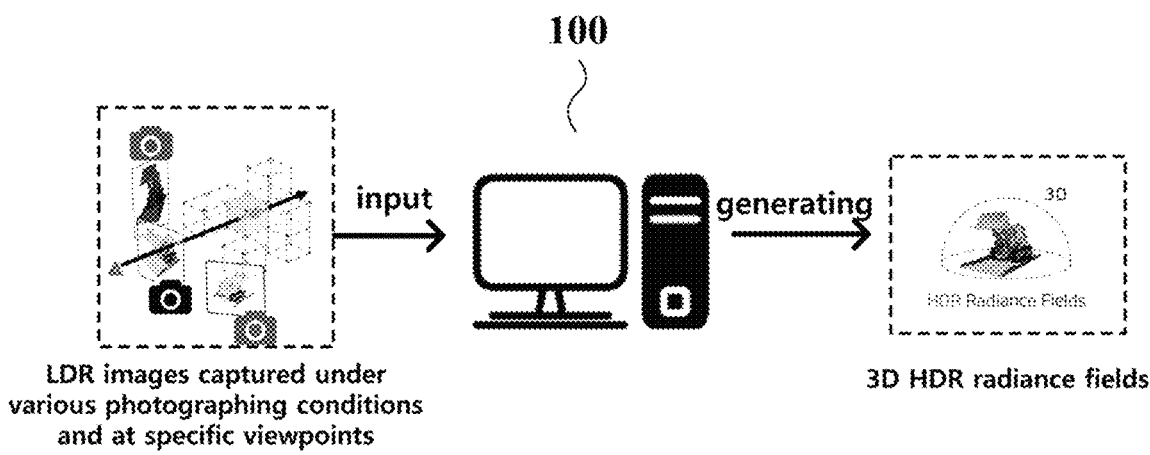
FIGS. 4A and 4B are views each illustrating an overall process of generating the 3D HDR radiance fields by an image processing device 100 and generating an HDR image or LDR images by using the generated 3D radiance fields.
Figure 4B:
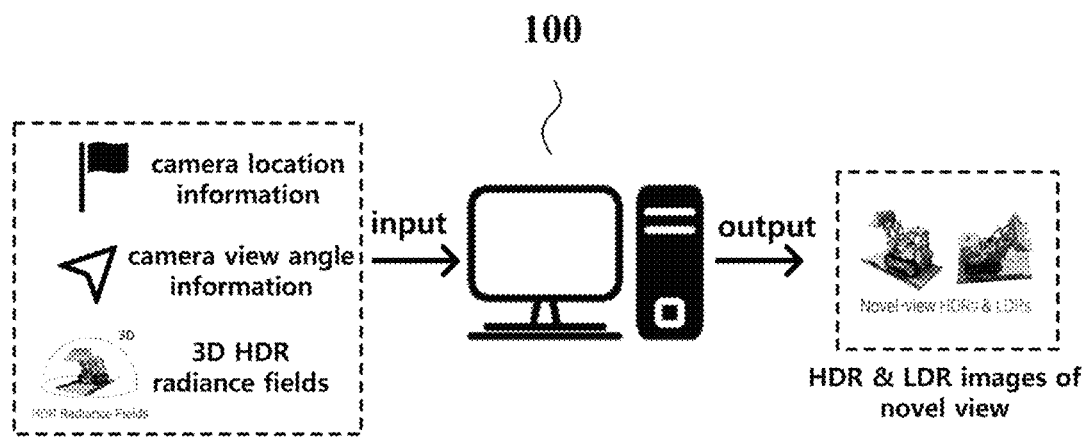

FIGS. 4A and 4B are views each illustrating an overall process of generating 3D HDR radiance fields by an image processing device 100 and generating an HDR images or LDR images by using the generated 3D radiance fields.

The image processing device 100 may generate the 3D HDR radiance fields (see FIG. 4A). The process of generating the 3D HDR radiance fields may also be seen as a process of training the 3D HDR radiance fields.

The image processing device 100 may receive an input of low dynamic range (LDR) images captured from various viewpoints as training data. The image processing device 100 may construct three-dimensional (3D) high dynamic range (HDR) radiance fields from the LDR images captured from the various viewpoints. The image processing device 100 may generate an HDR image by ray marching on the basis of the 3D HDR radiance fields. The image processing device 100 may generate a tone-mapped LDR image from the HDR image through a tone mapping module. The image processing device 100 may calculate a loss value on the basis of the LDR images captured from the various viewpoints and the tone-mapped LDR image. The image processing device 100 may modify parameters of the 3D HDR radiance fields and parameters of the tone mapping module, so as to maximally minimize the loss value.

The image processing device 100 may generate an LDR image or an HDR image by using the generated 3D HDR radiance fields (see FIG. 4B). This process may be seen as a process of inference using the 3D HDR radiance fields.

The image processing device 100 may receive an input of camera location information and camera view angle information. The image processing device 100 may generate an HDR image or an LDR image by ray marching on the basis of the camera location information, the camera view angle information, and the 3D HDR radiance fields.

Hereinafter, each step in which the image processing device generates 3D HDR radiance fields by using input (i.e., training) data will be described in detail.

FIG. 5 is a flowchart 200 illustrating a process of generating 3D HDR radiance fields by an image processing device.

In step 210, the image processing device may receive an input of low dynamic range (LDR) images captured from various viewpoints.

A dynamic range refers to a ratio between a maximum light intensity measured and a minimum light intensity measured, which are able to express brightness of an image.

An LDR image refers to an image having a low dynamic range. In the exemplary embodiment, in the LDR image, each RGB value of a pixel may be expressed in 8 bits. Accordingly, the LDR image may have a color value of 0 to 255 for each channel.

An HDR image refers to an image having a high dynamic range. In the exemplary embodiment, in the HDR image, each RGB value of a pixel may be expressed in 16 bits or more. Accordingly, the HDR image may have a color value of 0 to 65535 for each channel.

An LDR image may be captured through an image capture device. The image capture device may include a device such as a camera.

The image capture device may also generate an HDR image by synthesizing a plurality of LDR images. The image capture device may obtain the HDR image as well.

For example, an HDR image having a brightness value between 0 and 30 may be generated by using LDR images, including: a LDR image having a brightness value of 0 to 10; an LDR image having a brightness value of 8 to 20; and an LDR image having a brightness value of 15 to 30.

LDR images may refer to images obtained by capturing an object from various viewpoints. For example, for one object, the LDR images may include an image captured from the front, an image captured from the side, and an image captured from the back.

LDR images may be images captured under photometric conditions different from each other. For example, the LDR images may be images captured at exposure values different from each other, white balance different from each other, and camera response functions different from each other.

In step 220, the image processing device may construct 3D HDR radiance fields from the LDR images captured from the various viewpoints.

The 3D HDR radiance fields may include information required to calculate how an object will appear on a screen when the object is viewed from a particular location. The 3D HDR radiance fields may be a concept introduced in a known paper (NeRF: Representing Scenes as Neural Radiance Fields for View Synthesis).

The 3D HDR radiance fields may be used to determine a color value and opacity of a 3D point by receiving an input of information about a spatial location of the 3D point and a viewpoint (i.e., a viewing directions) facing toward the 3D point.

The color value of the 3D point may be HDR color value. The opacity may be a value indicating how much the 3D point occupies in a 3D space.

For example, when coordinate values (x, y, z) of a point in a 3D space and values (θ, φ) of a viewpoint facing toward a 3D point are input to learned 3D HDR radiance fields, a color value (i.e., RGB values) and opacity of the 3D point may be obtained.

Depending on viewpoints facing toward a 3D point, 3D HDR radiance fields may output color values different from each other and opacity different from each other. Accordingly, in order to use the 3D HDR radiance fields, information about the viewpoints of the 3D point is required.

The 3D HDR radiance fields include information required to generate an HDR image. Accordingly, a color value of a 3D point output by the HDR radiance fields may be expressed in higher bits. For example, RGB values of a 3D point may be expressed in 10 bits, 12 bits, 16 bits, or the like.

The 3D HDR radiance fields may be composed of voxels called Plenoxels. The Plenoxels may be a concept introduced in a paper (Plenoxels: Radiance Fields without Neural Networks).

A vertex may be located at each corner of the Plenoxels. The vertex may store spherical harmonic coefficients (i.e., SH coefficients) and opacity.

Details of Plenoxels are described below.

3D HDR radiance fields may have several parameters. A generated HDR image may vary depending on the parameters of the 3D HDR radiance fields. The parameters of the 3D HDR radiance fields may be modified in a training process.

In step 230, the image processing device may generate an HDR image by ray marching on the basis of the 3D HDR radiance fields.

The ray marching may refer to determining a pixel value of an image to be generated by using color values and opacity of all 3D points present on a corresponding straight line when the straight line is drawn in 3D HDR radiance fields from a particular viewpoint. Here, the straight line drawn in the 3D radiance fields may be referred to as a ray.

For example, in a case where there are five points on one ray, a pixel value of an HDR image may be determined by assigning an opacity value of each point as a weight to a RGB value and then adding each weight to get a weighted-sum.

The ray marching may also be performed by sampling some of all points on one ray. In the exemplary embodiment, a pixel value of an HDR image may be determined by sampling points on a ray at regular intervals, and then using RGB values and opacity of the sampled points.

For efficiency of training, white balance of the generated HDR image may be initialized. The initializing of the white balance may refer to setting a pixel value of the generated HDR image with a ratio value between an average color value of the entire HDR image and a color value of the generated HDR image.

A detailed process of initializing the white balance of the HDR image will be described below.

In step 240, the image processing device may generate tone-mapped LDR images from the HDR image through a tone mapping module.

The tone-mapped LDR image refers to an LDR image generated on the basis of RGB value information of the HDR image.

The tone-mapped LDR image may be an image for expressing the HDR image on a display. The reason is that a general display may have difficulty expressing all RGB values of the HDR image.

Tone-mapping may consist of two processes. A first process is a process of adjusting white balance. A second process is a process of applying a camera response function.

The adjusting of the white balance may include a process of adjusting an exposure value of the HDR image.

The tone mapping module may be a module designed on the basis of an internal pipeline of an actual physical camera. The above-described tone mapping process may be performed by using the tone mapping module. That is, the tone mapping module may be a module for generating a tone-mapped LDR image by adjusting the white balance of the HDR image and then applying the camera response function.

The tone mapping module may include several parameters. The generated tone-mapped LDR image may vary depending on parameter values of the tone mapping module. The parameter values of the tone mapping module may be modified in the training process. The parameter values of the tone mapping module may be modified in the process of generating the HDR radiance fields through the end-to-end training process. That is, the tone mapping module may be a module mathematically differentiable for training.

A detailed process of the tone mapping process will be described below.

In step 250, the image processing device may calculate a loss value on the basis of the LDR images captured from various viewpoints and the tone-mapped LDR image.

The loss value may include difference values between the tone-mapped LDR image and the LDR images captured at the various viewpoints. Alternatively, a loss value may include a value of voxels composed of the 3D HDR radiance fields not to differ much from those of neighboring voxels. Alternatively, a loss value may include a value indicating how appropriate a camera response function of tone-mapping is.

In a process of calculating a loss value, spherical harmonic coefficient masking may be performed. Through the spherical harmonic masking, the process of generating 3D radiance fields may be stabilized. Details are described below.

A saturation mask may be applied in the process of calculating a loss value. Through the saturation mask, the influence of an overexposed or underexposure region in the training process may be maximally minimize. Details are described below.

A loss function may be used to calculate a loss value. Details of the loss function are described below.

In step 260, the image processing device may modify the parameters of the 3D HDR radiance fields and the param eters of the tone mapping module, so as to maximally minimize a loss value.

The process of modifying the parameters may be referred to as a training process.

The parameters of the 3D HDR radiance fields may include the spherical harmonic coefficients (i.e., SH coefficients) and opacity of 3D HDR radiance fields, which will be described later.

The parameters of the tone mapping module may include parameters of a white balance function and parameter values of a camera response function, which will be described later.

The modifying of the parameters may include modifying the parameters of the white balance function and the parameter values of the camera response function on the basis of a reference image.

The reference image may refer to an image among input LDR images and having a color value most similar to an average color value of the input LDR images.

The reference image serves as an anchor or a reference in the training process. In a case where the reference image is used, the parameters may be prevented from diverging when the parameters of the white balance function are learned. That is, a phenomenon in which an HDR image is too dark or too bright may be prevented.

Details of using the reference image will be described below.

The modifying of the parameters includes a process of applying masking to spherical harmonic coefficients. The process of applying the masking may be seen as a process of performing regularization of the spherical harmonic coefficients. By applying the masking, a speed at which the spherical harmonic coefficients are modified in the training process may be adjusted. In this way, the training process may be stabilized.

In an early step of modifying the parameters of the 3D HDR radiance fields, masking allows modifying of merely spherical harmonic coefficients having degrees less than or equal to a predetermined standard among the spherical harmonic coefficients.

In a later step of the modifying the 3D HDR radiance fields, the masking also allows modifying of spherical harmonic coefficients having degrees greater than or equal to the predetermined standard among the spherical harmonic coefficients.

Details of applying the masking to the spherical harmonic coefficients will be described below.

Using the 3D HDR radiance fields generated through the above-described method, an HDR image and an LDR image may be generated (i.e., rendered) at desired viewpoints. That is, when the 3D HDR radiance fields that have been learned and generated are used, the HDR and the LDR images may be freely generated at the desired viewpoints by designating particular camera locations.

Hereinafter, the method for generating an HDR image or an LDR image by using 3D HDR radiance fields generated by the image processing device will be described.

The image processing device may receive an input of location information of a reference point (i.e., camera center) and viewpoint information on the reference point of a camera.

The reference point may be a point of reference for viewing an imaginary object. A line generated when the object is viewed from the reference point may be referred to as the above-described ray.

The location information of the reference point may refer to a current location of the reference point. In the exemplary embodiment, the current location of the reference point may be expressed as (x, y, z) in a 3D space.

The viewpoint information of the reference point may refer to an angle at which the reference point looks at an object.

The image processing device may generate an HDR image by ray marching on the basis of camera location information, camera view angle information, and 3D HDR radiance fields. In this case, the 3D HDR radiance fields may be 3D HDR radiance fields generated by the method, which is described in FIGS. 4 and 5, of generating the 3D HDR radiance fields.

In order to generate LDR images, the image processing device may obtain tone-mapped LDR images by inputting the generated HDR image to the tone mapping module.

The tone mapping module is designed on the basis of a pipeline inside an actual physical camera. Accordingly, parameters of the tone mapping module consist of physically interpretable values. Accordingly, as required, when the tone-mapped LDR images are obtained, rendering with adjusted photometric information is performable by changing physical values of the tone mapping module.

In the exemplary embodiment, before inputting the HDR image generated during the rendering to the tone mapping module, parameter values of the tone mapping module may be modified according to a user's modification request information. Accordingly, when the generated HDR image is input to the tone mapping module having the modified parameters, the tone-mapped LDR images different from previous tone-mapped LDR images may be generated. For example, tone-mapped LDR images having different white balance may be generated. The user's modification request information may include information on how the user changes the parameters of the tone mapping module.

In the exemplary embodiment, by changing the camera response function of the tone mapping module to another one, the user may generate tone-mapped LDR images similar to images captured by cameras different from each other. For example, by using a camera response function used in an iPhone, the user could generate tone-mapped LDR images which have similar APPLE iPhone style from the image captured by SAMSUNG Galaxy and vice versa.

Hereinafter, Plenoxels will be described in detail.

Figure 6:
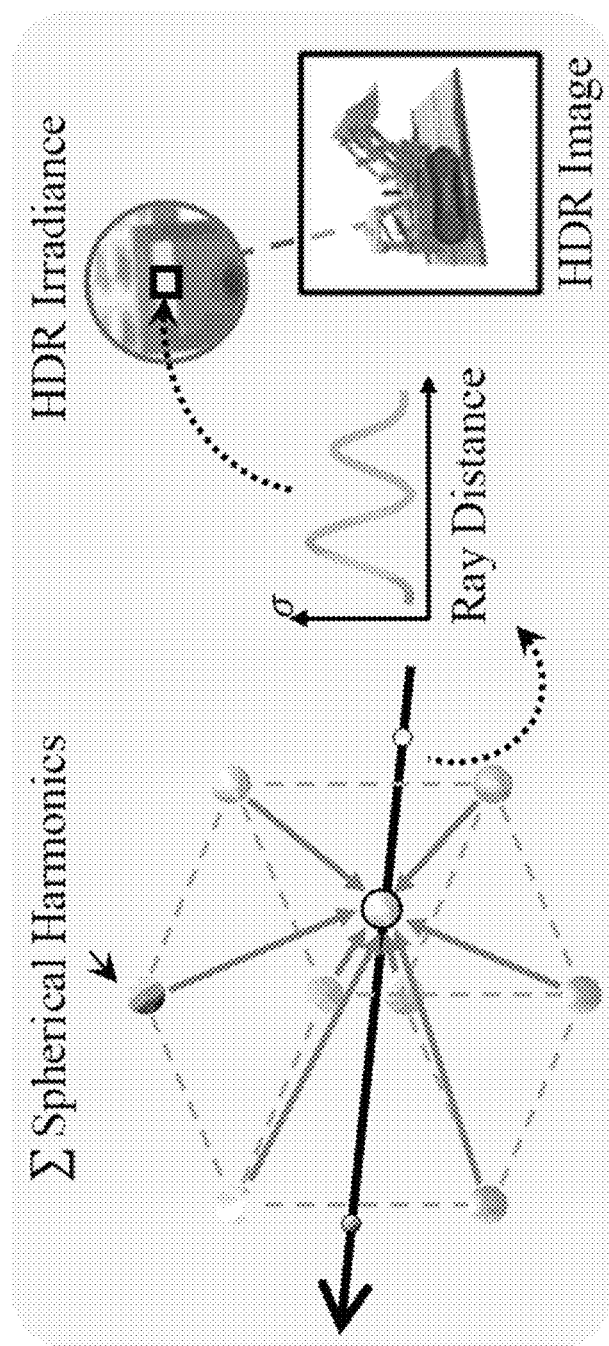
FIG. 6 is a view illustrating a process of generating an HDR image by applying the technology described below to Plenoxels, which is an existing method for generating 3D radiance fields.

FIG. 6 shows a process of generating an HDR image by using HDR-Plenoxels.

The Plenoxels may be voxels constituting 3D HDR radiance fields.

A vertex located at each corner of the Plenoxels stores spherical harmonic coefficients (i.e., SH coefficients) and opacity.

The spherical harmonic coefficients and opacity, which are stored in each vertex, may be used to determine a color and opacity of a point on a ray passing through the Plenoxels.

In the exemplary embodiment, color and opacity of a point of one ray passing through the Plenoxels may be determined by trilinear interpolation of the spherical harmonic coefficients and opacity, which are stored in each vertex.

Equation 1 is an equation used to generate an HDR image by ray marching on the basis of HDR radiance fields composed of Plenoxels.

$$\hat{C}(r) = \sum_{i=1}^{N} T_i(1 - \exp(-\sigma_i \delta_i))c_i, \text{ where } T_i = \exp\left(-\sum_{j=1}^{i-1} \sigma_j \delta_j\right)$$ [Equation 1]

In Equation 1, $\hat{C}(r)$, denotes a pixel value of the HDR image generated when the ray marching is performed on a particular ray r. In Equation 1, N denotes the number of points sampled in the particular ray r. In Equation 1, $T_i$ denotes transmittance of an i-th point. In Equation 1, $\sigma_i$ denotes opacity of the i-th point. In Equation 1, $\delta_i$ denotes an interval between the i-th point and an (i+1)-th point. In Equation 1, $c_i$ denotes a color value at a particular ray viewpoint, the color value being calculated through spherical harmonic coefficients stored at each vertex of the Plenoxels.

A vertex located at each corner of Plenoxels may have 28-dimensional vector values.

The spherical harmonic coefficients are stored in 27 dimensions out of the 28 dimensions. The spherical harmonic coefficients may have nine values for each RGB channel. That is, the spherical harmonic coefficients may have 9×3 values.

The Opacity is stored in one dimension out of the 28 dimensions.

The spherical harmonic coefficients and opacity stored at each vertex of the Plenoxels may be changed in a training process. In other words, the spherical harmonic coefficients and opacity may be parameter values of the HDR radiance fields.

The spherical harmonic coefficients are likely to be changed significantly during the training process. In this case, these changes destabilize the training process. Accordingly, the spherical harmonic coefficients may be initialized to appropriate values. In the exemplary embodiment, a color may be initialized to gray by adding 0.5 to a color value and 0.1 to opacity.

Hereinafter, a tone-mapping process will be described in detail.

Figure 7:
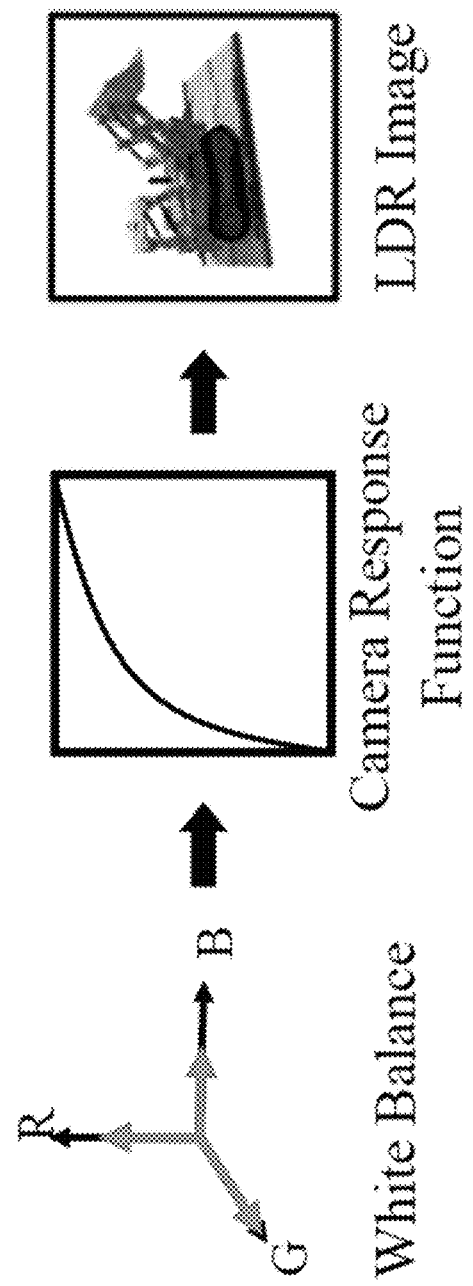
FIG. 7 is a view illustrating a tone-mapping process.

FIG. 7 shows a tone-mapping process.

The tone-mapping step may be composed of two processes.

The first process of the tone-mapping is a process of adjusting white balance.

Equation 2 is an equation used when white balance is adjusted.

$$I_w = w(C_h(r), \theta_w) = C_h(r) \odot \theta_w = \begin{bmatrix} c_h^r \\ c_h^g \\ c_h^b \end{bmatrix} \odot \begin{bmatrix} w_r \\ w_g \\ w_b \end{bmatrix} = \begin{bmatrix} w_r c_h^r \\ w_g c_h^g \\ w_b c_h^b \end{bmatrix}$$ [Equation 2]

In Equation 2, $I_w$ denotes an HDR image of which the white balance is adjusted. In Equation 2, w denotes a white balance adjustment function. In Equation 2, $C_h(r)$ denotes a pixel value of the HDR image generated by ray marching through a particular ray r. The $C_h(r)$ may be a vector composed of RGB values ($C_h(r)=[c_h^r, c_h^g, c_h^b]$). In Equation 2, θ denotes a parameter of a function for adjusting white balance. In Equation 2, ⊙, denotes an element-wise product operator. In Equation 2, the parameter of the function for adjusting the white balance may be adjusted.

The process of adjusting the white balance includes a process of adjusting an exposure value. That is, the white balance function may adjust the white balance considering the exposure value.

There is inherent ambiguity between model components of an imaging pipeline of a typical camera due to their inherent relationships. For example, when an exposure time is doubled while reducing white balance by half, a resulting image may appear identical to an image having an original setting of the exposure time. The white balance function of the tone mapping module may adjust the white balance considering an exposure value. In other words, in order to resolve the inherent ambiguity between the exposure value and the white balance, the exposure value may be expressed as a ratio between scale and white balance.

For example, there may be a case where RGB values of a pixel are (0.4, 0.6, 0.8). In a case where brightness is halved while maintaining white balance of the pixel, the RGB values of the pixel may be adjusted to (0.2, 0.3, 0.4).

The second process of the tone-mapping is a process of applying a camera response function.

In general, the camera response function may be a function for representing a relationship between an observation result and the radiance of a scene.

The camera response function may be a non-linear function. The camera response function may be approximated by using several linear functions. For example, the camera response function may be divided into about 256 intervals, a control point may be set in each interval, and then the camera response function may be parameterized through the set control points.

The camera response function may become differentiable by one-dimensional (1D) grid-sampling.

A leaky-thresholding method may be applied to propagate a loss of a saturation region of a rendered image in the process of modifying the parameters of the 3D HDR radiance fields.

Equation 3 is an equation used when leaky-thresholding is performed.

$$g_{leaky}(x) = \begin{cases} \alpha x, & x < 0 \\ g(x), & 0 \leq x \leq 1 \\ -\frac{\alpha}{\sqrt{x}} + \alpha + 1, & 1 < x, \end{cases}$$ [Equation 3]

In Equation 3, a is a thresholding coefficient.

Hereinafter, a process of setting a reference image from a generated HDR image and a process of initializing white balance will be described.

There is a possibility that a total size of the white balance function, which also considers an exposure value in the training process, will be learned significantly small or large. To prevent this possibility, a reference image may be set.

First, an average color $(r_a, g_a, b_a)$ of all input images is calculated. After selecting a reference image having a color value closest to the average color value, a white balance value of the selected reference image is fixed. In the case where the white balance value of the reference image is fixed, the values of the remaining images may also be learned so as not to deviate significantly from a scale of the reference image during the training process.

Even when the reference image is selected and the color value of the reference image is fixed, an ambiguous relationship between the white balance and the spherical harmonic coefficients may still exist. In particular, in a case where a difference between exposure values of input images is very large, it may be misunderstood that an intensity difference between the input images is caused by high-frequency reflectance. In this case, since rays may arrive at scenes different from each other, incorrect geometric information may be provided.

In this case, the ambiguity may be resolved by using mean pixel value for each camera to initialize the white balance. In this way, the training process may proceed stably and quickly.

Equation 4 is an equation used when white balance is initialized.

$$wb_{c,i} = \frac{\text{mean}_{k \in I_i}(c_k)}{\text{mean}_{j \in S}(c_j)}$$ [Equation 4]

A ratio between an average RGB value of the entire image set S and an average RGB value of each image may be calculated. Through the calculated result, the white balance of an initial LDR image $I_i$ may be initialized before 3D HDR radiance fields are learned.

Hereinafter, spherical harmonic regularization will be described.

FIG. 8 shows a process of spherical harmonic regularization.

The spherical harmonic regularization may refer to a process of applying masking to spherical harmonic coefficients in a training process.

In a case of a harsh condition in which each of images having a large difference in exposure values or white balance values is given as training data, the above-described process of initializing the white balance may stabilize an early training step.

In addition, the speed of training the white balance function and the speed of training the spherical harmonic coefficients may not match. In this case, the above-described ambiguity may occur again in a later training step. That is, a result of restoration shows that colors of the 3D HDR radiance fields flicker and are inconsistent.

To prevent such a result, spherical harmonic coefficient masking may be performed.

The spherical harmonic coefficient masking may allow that a diffuse reflectance property is first learned before direction-sensitive one is learned later. In the exemplary embodiment, the spherical harmonic coefficient masking may allow that a low-frequency part (i.e., a color itself) of the spherical harmonic coefficients is first learned before a high-frequency part (i.e., a degree of reflection by a light source) is learned.

An example is as follows. When there are spherical harmonic coefficients of degrees 1 to 3, masking is first applied to spherical harmonic coefficients of degrees 2 and 3. Applying the masking refers to adjusting of a rate at which coefficients of the corresponding degrees are reflected. Accordingly, the spherical harmonic coefficients of the degree 2 and degree 3 are not learned in an initial training process. Afterwards, a progressive weight is increased and applied from zero by ⅕ per training during early five trainings for the sake of progressive training. Accordingly, after the half of total iteration, the spherical harmonic coefficients of all degrees may be updated with an entire rate.

That is, as shown in FIG. 8, a progressive weight is set to zero in the early training step, and the progressive weight is progressively set, so as to be 1 as the training proceeds.

Such a training plan may stabilize the training in the above-described harsh condition. High-quality 3D HDR radiance fields may be restored through the spherical harmonic coefficient regularization.

Hereinafter, a process of applying a saturation mask will be described.

When a scene having a wide dynamic range is obtained, each LDR image may include overexposure or underexposure. Since texture is lost in such an overexposure or underexposure, there may be no clues to infer correct geometric or photometric information. This may cause an outlier when a loss is calculated in the training process. In order to maximally minimize of an effect of such an overexposure or underexposure and ensure that recovery is not biased, a saturation mask may be used when the loss is calculated.

The saturation mask can be expressed as Equation 5.

$$\text{mask}(x) = \begin{cases} \left(\frac{x+\text{low}}{2\text{low}}\right)^2 & x < \text{low}, \\ 1, & \text{low} \leq x \leq \text{high}, \\ \left(\frac{2-x}{2(1-\text{high})}\right)^2 & x > \text{high}, \end{cases} \quad \text{[Equation 5]}$$

A user may set a low value and a high value in Equation 5 in advance. In the exemplary embodiment, the user may set the low value to 0.15 and the high value to 0.9.

A loss function used in the process of modifying parameters will be described below.

Equation 6 is a loss function equation used to calculate a loss.

$$\mathcal{L} = \mathcal{L}_{recon} + \lambda_{TV}\mathcal{L}_{TV} + \lambda_{smooth}\mathcal{L}_{smooth} \quad \text{[Equation 6]}$$

In Equation 6, $\lambda_{TV}$ and $\lambda_{smooth}$ are constant values.

Equation 6 consists of three terms ($L_{recon}$, $\lambda_{TV}L_{TV}$, and $\lambda_{smooth}L_{smooth}$). L is the loss function. $\lambda$ is the coefficient, which determines the ratio of the loss function value.

The first term ($L_{recon}$; recon means reconstruction) is a term for reconstruction of a tone-mapped LDR image. The first term induces the tone-mapped LDR image to be close to an input LDR image.

Equation 7 is an equation used to calculate a tone-mapped LDR reconstruction term.

$$\mathcal{L}_{recon} = \frac{1}{|\mathcal{R}|}\sum_{r\in\mathcal{R}}M_i(r)\left\|I_i\left(\prod_i(r)\right) - \mathcal{T}(\hat{C}(r))\right\|_2^2 \quad \text{[Equation 7]}$$

In Equation 7, Π refers to a camera projection operator from ray r to 2D pixel coordinates of an i-th image. In Equation 7, $M_i(r)$ refers to the above-described saturation mask. In Equation 7, ĉ(r) refers to a pixel value of an HDR image generated in 3D radiance fields. In Equation 7, T refers to a tone-mapping function. In Equation 7, R refers to the entire ray of the image.

The second term ($\lambda_{TV}L_{TV}$) relates to total variation. The second term reduce the artifacts by making 3D geometry smoother and clustered. The second term induces values of voxels of resulting Plenoxels not to differ much from those of neighboring voxels. The second term induces values of voxels composed of the 3D HDR radiance fields not to differ much from those of neighboring voxels.

Equation 8 is an equation used to calculate an overall variable regularization term.

$$\mathcal{L}_{TV} = \frac{1}{|V|}\sum_{v\in V, d\in[D]}\sqrt{\Delta_x^2(v,d) + \Delta_y^2(v,d) + \Delta_z^2(v,d) + \epsilon} \quad \text{[Equation 8]}$$

In Equation 8, Δ may be calculated between successive voxels along axes of (x, y, z). For example, a difference between a d-th value of a (x, y, z) voxel and a d-th value of a (x+1, y, z) voxel may be calculated.

Equation 8 may be separately applied to the spherical harmonic coefficients and opacity. That is, a weight $\lambda_{(TV, SH)}$ of the spherical harmonic coefficients and a weight $\lambda_{(TV, \sigma)}$ of the opacity may have values different from each other.

The third terms ($L_{smooth}$) for a smoothness loss. The smoothness loss may be used to obtain a camera response function that is physically appropriate.

Equation 9 is an equation used to calculate a smoothness loss.

$$\mathcal{L}_{smooth} = \sum_{i=1}^{N}\sum_{e\in[0,1]}g_i''(e)^2$$

In Equation 9, g" (e) is a second differential function of a camera response function.

A researcher conducted an experiment to evaluate the performance of the method for generating 3D HDR radiance fields.

The researcher compared the performance of the method for generating the 3D HDR radiance fields with those of the conventional image processing methods.

The conventionally known image processing methods include: Plenoxels (Plenoxels: Radiance Fields without Neural Networks. IEEE Conference on Computer Vision and Pattern Recognition (CVPR) (2022)); NeRF-A (NeRF in the Wild: Neural Radiance Fields for Unconstrained Photo) Collections. In: IEEE Conference on Computer Vision and Pattern Recognition (CVPR) (2021)); and ADOP (ADOP: Approximate Differentiable One-Pixel Point Rendering, ACM Transactions on Graphics (TOG) (2022).

The NeRF-A and ADOP are the conventional technologies that attempt to solve problems similar to those of the above-described method for generating 3D HDR fields. Unlike the method for generating the 3D HDR fields described above, the NERF-A and ADOP are methods based on neural networks. The result of experiments conducted by the researcher will be described below.

Tables 1 to 5 are respective results of comparing the method (Ours) of generating the 3D HDR radiance fields with the conventional image processing methods. The Plenoxels method was used as a baseline.

As input LDR images, images captured with fixed (i.e., static) photometric conditions S and images captured with various (i.e., varying) photometric conditions V were used.

Table 1 is for a BOOK data set. Table 2 is for a Classroom data set. Table 3 is for a Monk data set. Table 4 is for a Room data set. Table 5 is for a Kitchen data set.

From Tables 1 to 5, it may be confirmed that the NeRF-A has the best performance in the conventional image processing methods. Similarly, it may be confirmed that the performance of the method for generating the 3D HDR radiance fields is competitive.

TABLE 1

| Type | Method | PSRN↑ | SSIM↑ | LPIPS↓ |
|---|---|---|---|---|
| S | Baseline | 22.53 | 0.796 | 0.293 |
| V | Baseline | 11.92 | 0.454 | 0.597 |

TABLE 1-continued

| Type | Method | PSRN↑ | SSIM↑ | LPIPS↓ |
|---|---|---|---|---|
| V | ADOP | 22.15 | 0.824 | 0.291 |
| V | NeRF-A | 28.44 | 0.873 | 0.310 |
| V | Ours | 27.49 | 0.837 | 0.292 |

TABLE 2

| Type | Method | PSRN↑ | SSIM↑ | LPIPS↓ |
|---|---|---|---|---|
| S | Baseline | 28.71 | 0.902 | 0.261 |
| V | Baseline | 12.83 | 0.542 | 0.660 |
| V | ADOP | 21.04 | 0.800 | 0.345 |
| V | NeRF-A | 29.30 | 0.895 | 0.295 |
| V | Ours | 29.87 | 0.908 | 0.284 |

TABLE 3

| Type | Method | PSRN↑ | SSIM↑ | LPIPS↓ |
|---|---|---|---|---|
| S | Baseline | 27.15 | 0.848 | 0.281 |
| V | Baseline | 15.81 | 0.535 | 0.542 |
| V | ADOP | 21.92 | 0.764 | 0.392 |
| V | NeRF-A | 27.33 | 0.793 | 0.398 |
| V | Ours | 28.27 | 0.852 | 0.297 |

TABLE 4

| Type | Method | PSRN↑ | SSIM↑ | LPIPS↓ |
|---|---|---|---|---|
| S | Baseline | 30.70 | 0.912 | 0.183 |
| V | Baseline | 13.28 | 0.599 | 0.643 |
| V | ADOP | 19.25 | 0.834 | 0.329 |
| V | NeRF-A | 30.32 | 0.891 | 0.234 |
| V | Ours | 28.70 | 0.900 | 0.291 |

TABLE 5

| Type | Method | PSRN↑ | SSIM↑ | LPIPS↓ |
|---|---|---|---|---|
| S | Baseline | 33.43 | 0.957 | 0.138 |
| V | Baseline | 18.24 | 0.718 | 0.496 |
| V | ADOP | 20.13 | 0.827 | 0.280 |
| V | NeRF-A | 31.30 | 0.928 | 0.233 |
| V | Ours | 31.53 | 0.936 | 0.156 |

Figures 9A, 9B, 9C:
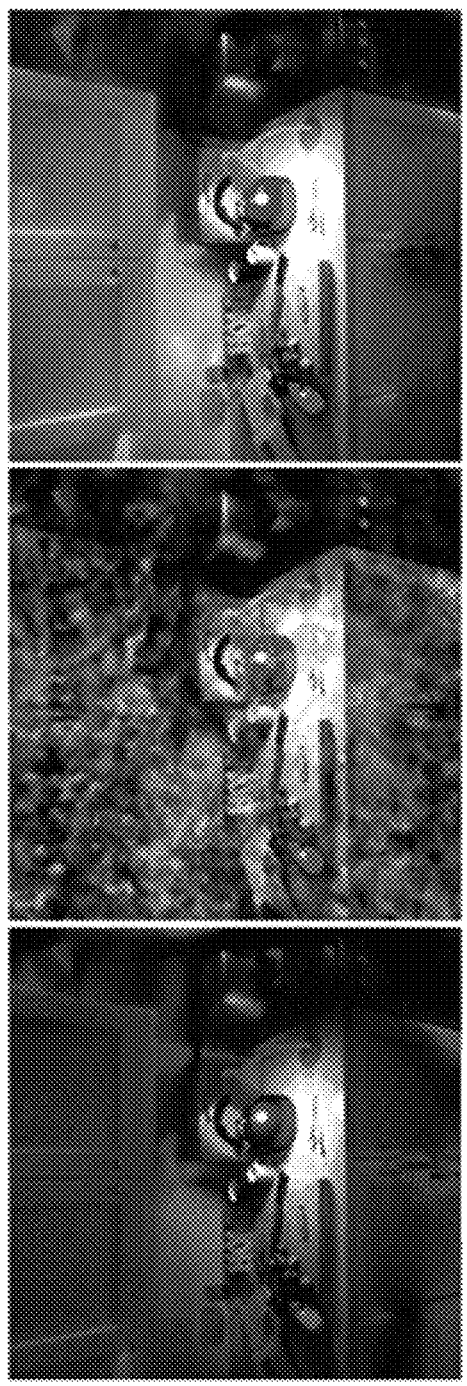
FIGS. 9A to 9C are views each illustrating a result of constructing 3D radiance fields by using LDR images captured at viewpoints different from each other and generating an image based on the 3D radiance fields.

FIGS. 9A to 9C are views each illustrating a result of constructing 3D radiance fields by using LDR images captured at viewpoints different from each other and generating an image based on the 3D radiance fields.

FIG. 9A shows the result of generating an image by a conventional image processing method using LDR images, as input data, captured in a state in which photometric conditions are fixed (i.e., are static).

FIG. 9B shows the result of generating an image by a conventional image processing method using LDR images, as input data, captured under varying photometric conditions.

FIG. 9C shows the result of generating an image by applying the above-described method for generating 3D HDR radiance fields while using LDR images, as input data, captured under varying photometric conditions.

In the conventional image processing method, the image may be generated without a problem in the case where images having static photometric conditions are used.

However, in the conventional image processing method, in the case where the images under the varying photometric conditions different from each other are used, an novel-view image having noise in which a geometric structure is broken is generated.

By contrast, in the method for generating the 3D HDR radiance fields, the novel-view image is well produced even by using the images captured under the photometric conditions different from each other.

From FIGS. 9A to 9C, in the method for generating the 3D HDR fields, it may be confirmed that the HDR image is well generated even when there are the LDR images captured under the varying photometric conditions.

Figure 10:
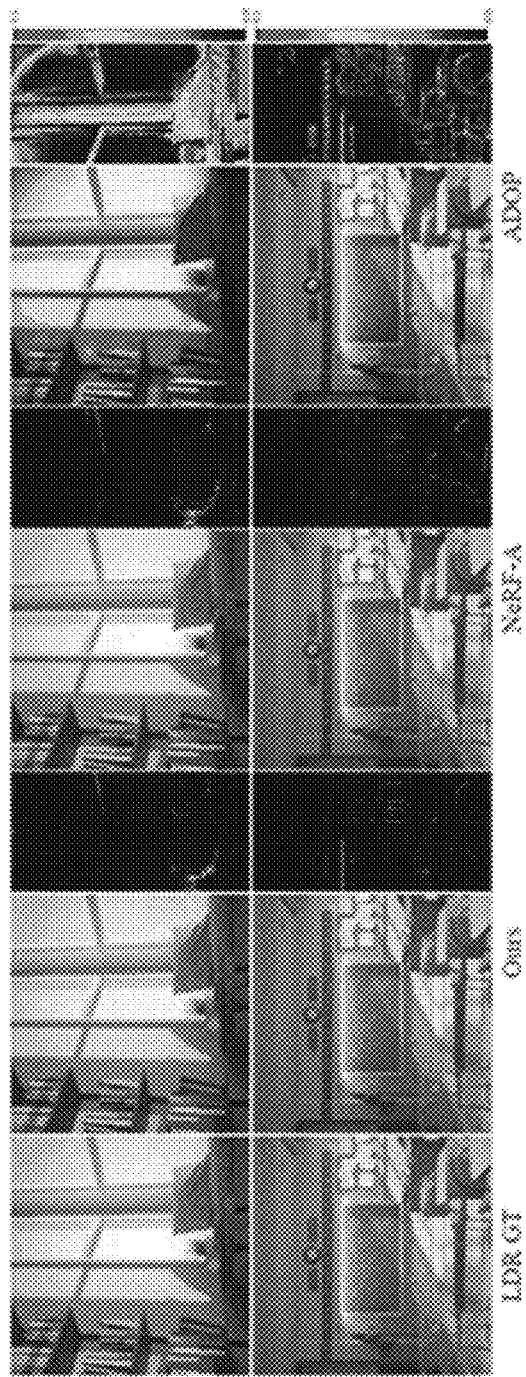
FIG. 10 is a view illustrating a result of comparing a resulting image generated from a novel view using LDR images captured under varying photometric conditions with those of the related art.

FIG. 10 shows a result of generating images by using LDR images captured under varying photometric conditions. A mean square error (MSE) map was used to compare a synthesized image and ground truth LDR GT values.

It may be confirmed that an MSE map value of the method for generating the 3D HDR radiance fields (Ours) is generally low. This is also similar to the case of NeRF-A as a conventional image processing method.

On the other hand, in a case where the ADOP is used as a conventional image processing method, it may be confirmed that a MSE map has a generally high value.

It may be confirmed that the method for generating the 3D HDR radiance fields described above through FIG. 10 shows good performance in restoring the HDR image and LDR images by using the LDR images captured under the varying photometric conditions.

Figure 11:
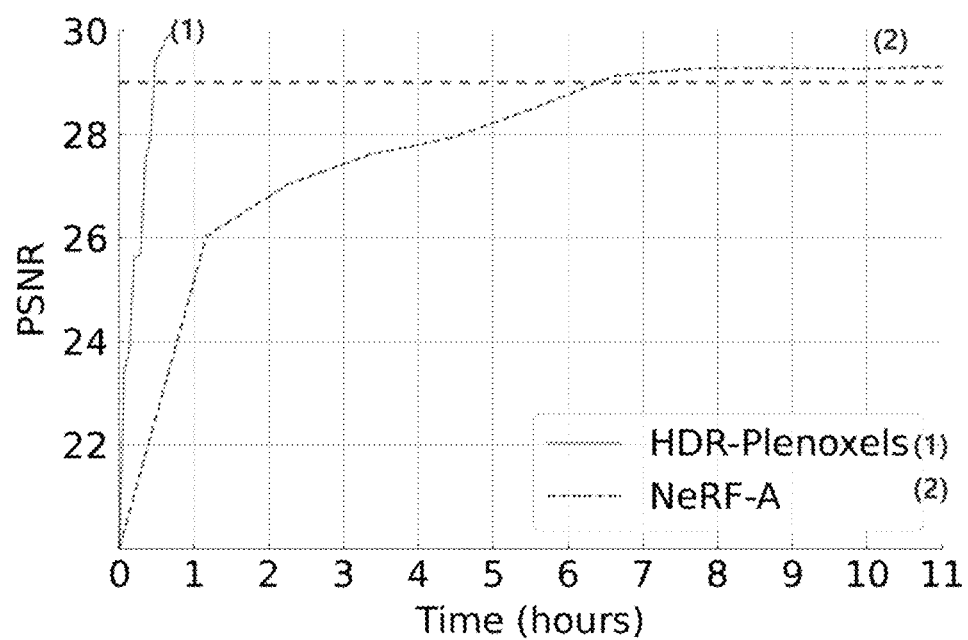
FIG. 11 is a view illustrating a result of comparing training speeds of the method (i.e., HDR-Plenoxels) for generating the 3D HDR radiance fields, the method being presented in the technology described below, with those of the related art (i.e., NeRF-A).

FIG. 11 shows a result of comparing a training speed of the method (i.e., the HDR-Plenoxels) of generating the 3D HDR radiance fields with that of the related art (i.e., the NeRF-A). For fair comparison, the same RTX3090 was used.

Through FIG. 11, it may be confirmed that it took about 30 minutes for the HDR-Plenoxels to achieve a peak signal-to-noise ratio (PSNR) of 29. By contrast, it may be confirmed that it took about 6 hours and 30 minutes for the NeRF-A to achieve same PSNR. That is, it may be confirmed that the speed of the HDR-Plenoxels is about 13 times faster than that of the NeRF-A.

Through Tables 1 to 5 and FIGS. 9A to 9C to 11, it may be confirmed that the method for generating the 3D HDR radiance fields does not deteriorate in performance and has a fast training speed compared to those of the conventional image processing methods.

Figure 12:
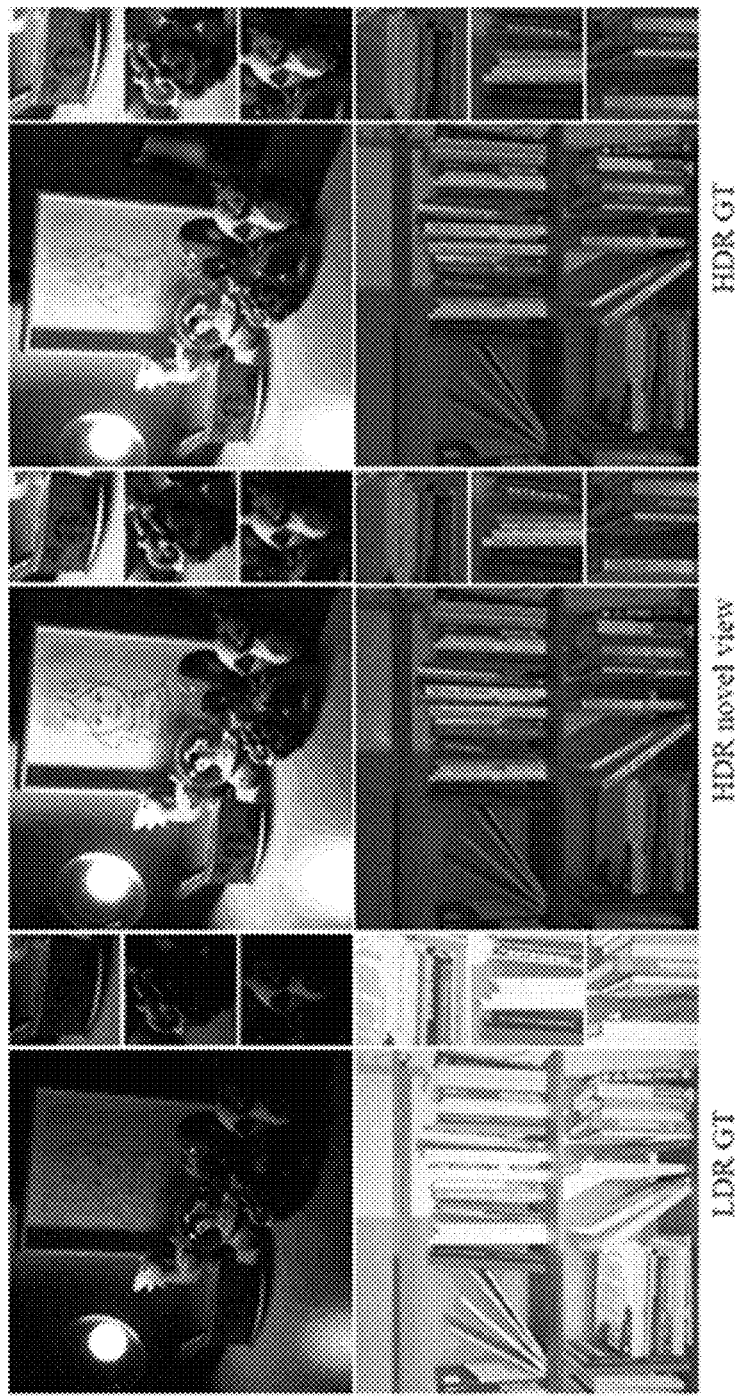
FIG. 12 is a view illustrating a result of confirming whether 3D HDR radiance fields may be well generated by using an LDR image (i.e., a LDR GT (Ground Truth)) at an oversaturation point or undersaturation point of image color.

FIG. 12 shows a result of confirming whether 3D HDR radiance fields may be well generated by using an given LDR image (i.e., an LDR GT) at an oversaturation point or undersaturation point.

The first row in FIG. 12 shows a result confirmed at the undersaturation point. The second row in FIG. 12 shows a result confirmed at the oversaturation point.

It may be confirmed that an HDR novel view generated by the Our method for generating the 3D HDR radiance fields has no significant difference when compared with a shape of the input LDR image (i.e., the LDR GT) or the HDR image generated from the input LDR image.

In particular, it may be confirmed that even though it is difficult to identify an exact color or detailed letters of the oversaturated or unsaturated image (i.e., the LDR GT), the 3D HDR radiance fields generated by the above-described method reconstruct a corresponding part well. In addition, it may be confirmed that the 3D HDR radiance fields generated by the above-described method are well restored to detail.

That is, through FIG. 12, it may be confirmed that the 3D HDR radiance fields may be well generated even when the LDR image at the oversaturation or undersaturation point is used.

Table 6 shows a result confirmed through ablation studies to evaluate effects of detailed modules of tone-mapping.

TABLE 6

|     | WB | VIG | CRF | PSRN↑ | SSIM↑ | LPIPS↓ |
| --- | --- | --- | --- | --- | --- | --- |
| (A) |    |    |    | 14.42 | 0.569 | 0.587 |
| (B) | ✓  |    |    | 23.03 | 0.811 | 0.355 |
| (C) | ✓  | ✓  |    | 21.12 | 0.799 | 0.352 |
| (D) | ✓  |    | ✓  | 29.34 | 0.876 | 0.294 |
| (E) | ✓  | ✓  | ✓  | 26.73 | 0.878 | 0.264 |

In table 6, WB means white balance, VIG means vignetting, CRF means camera response function, PSRN means Peak Signal-to-noise ratio, SSIM means Structural Similarity Index Measure LPIPS means and LPIPS means Learned Perceptual Image Patch Similarity.

Through the result of comparing (A) and (B) in Table 6, it may be confirmed that the performance is improved when white balance (WB) is adjusted. That is, it may be confirmed that more accurate geometric features and colors may be learned in the case where the white balance (WB) is adjusted.

Through respective results of comparing (B) and (D) in Table 6 and comparing (D) and (E) in Table 6, it may be confirmed that the performance deteriorated when a vignetting effect is applied in addition to the white balance.

From Table 6, it may be confirmed that the performance in (D) is the best. In other words, it may be confirmed that the best performance is obtained when a tone mapping module for controlling both of a white balance adjustment function and a camera response function is applied.

Figure 13:
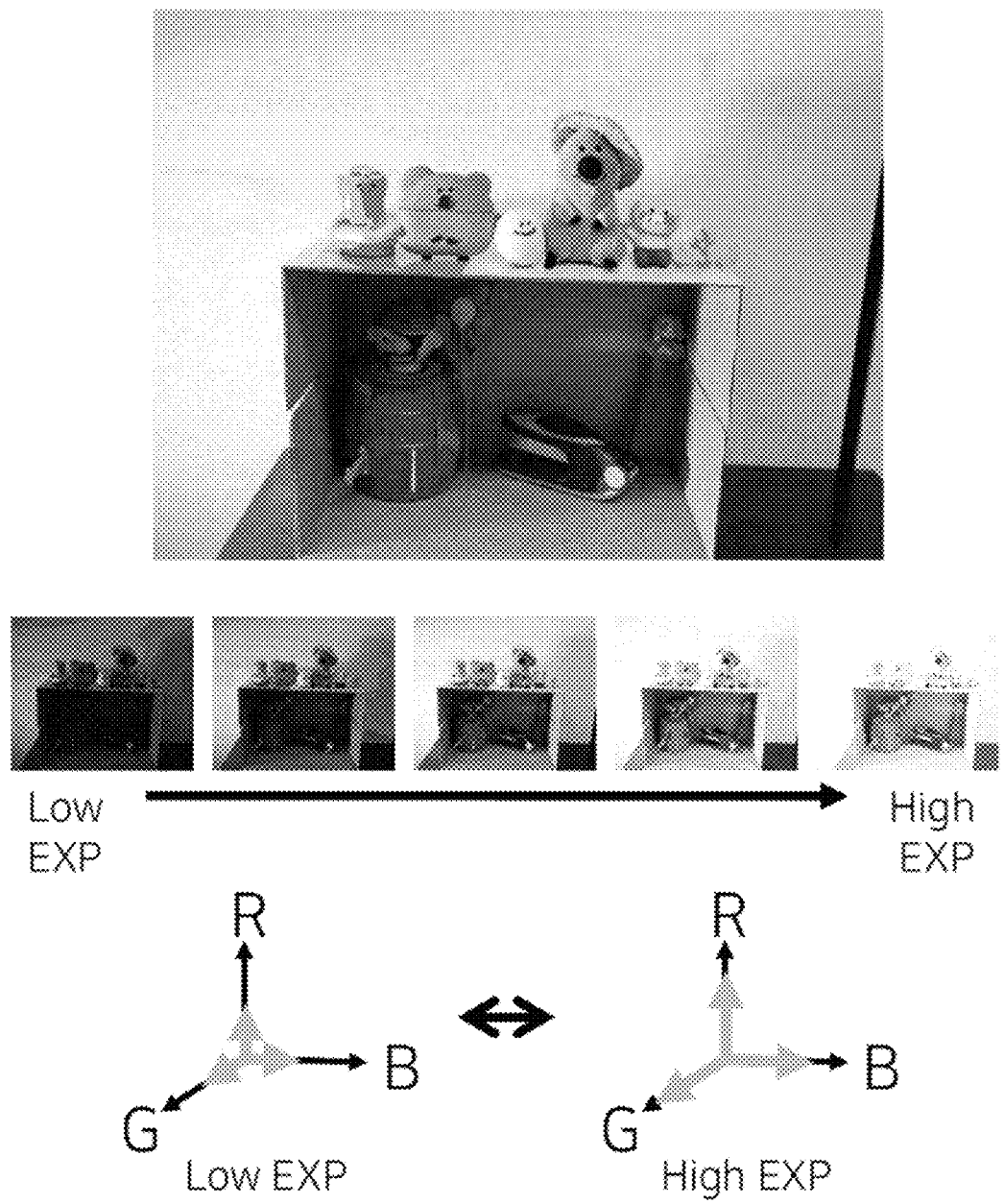
FIG. 13 is a view illustrating a process of adjusting rendering by freely adjusting an exposure photometric condition through a tone mapping module presented in the technology described below.

FIGS. 13 and 14 show a process of adjusting rendering. Particularly, FIGS. 13 and 14 show respective results of generating tone-mapped LDR images under conditions different from each other by adjusting parameter values of the tone mapping module.

FIG. 13 shows the result of adjusting an exposure value through white balance adjustment. When the overall white balance parameter value is increased while maintaining a white balance ratio of an image, the overall exposure value may be increased.

FIG. 14 shows the result of adjusting each element of white balance. When required, the white balance of an image may be adjusted while adjusting some of the white RGB values of the image.

A configuration of an image processing device will be described below.

Figure 15:
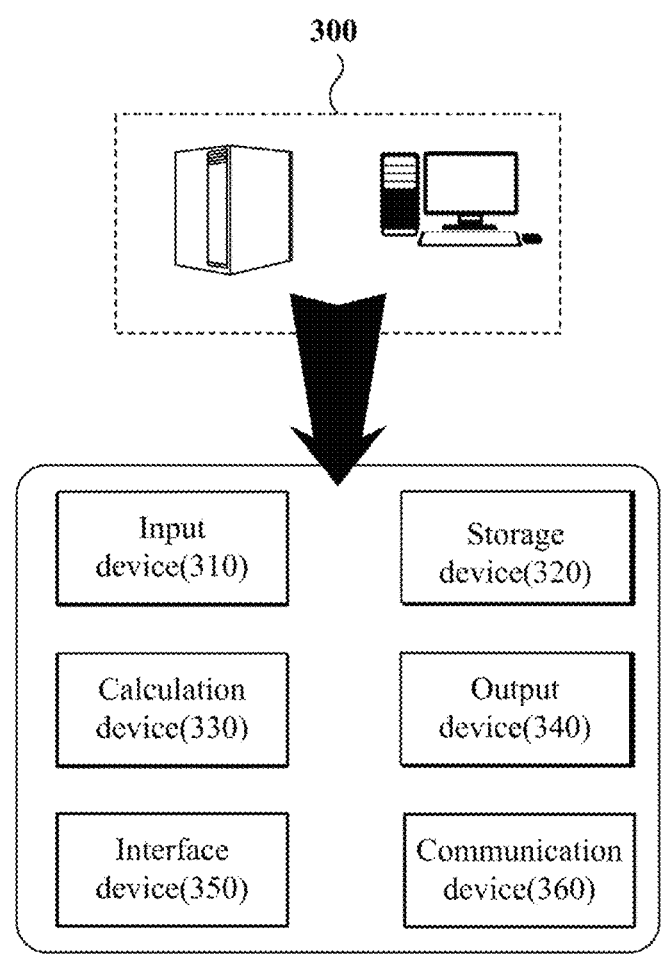
FIG. 15 is a view illustrating an example of a configuration of the image processing device 300.

FIG. 15 is a view illustrating an example of a configuration of the image processing device 300.

The image processing device 300 may correspond to the image processing device 100 described in FIG. 1. The image processing device 300 may perform the method for generating the 3D HDR radiance fields described above.

The image processing device 300 may be physically implemented in various forms such as a PC, a laptop computer, a smart device, a server, or a chipset dedicated to data processing.

The image processing device 300 may include an input device 310, a storage device 320, a calculation device 330, an output device 340, an interface device 350, and a communication device 360.

The input device 310 may also include an interface device (i.e., a keyboard, a mouse, a touch screen, etc.) for receiving predetermined commands or data. The input device 310 may also include a component for receiving information through a separate storage device (i.e., a USB, a CD, a hard disk, etc.). The input device 310 may also receive input data through a separate measurement device or through a separate DB. The input device 310 may receive the data through wired or wireless communication.

The input device 310 may receive an input of information or a model, which are required to perform the method for generating the 3D HDR radiance fields. The input device 310 may receive an input of LDR images captured at various viewpoints.

The storage device 320 may store the input information received through the input device 310. The storage device 320 may store the information generated in a process of calculation by the calculation device 330. That is, the storage device 320 may include a memory. The storage device 320 may store a result calculated by the calculation device 330.

The storage device 320 may store the information or the model, which are required to perform the method for generating the 3D HDR radiance fields.

The calculation device 330 may be a device such as a processor, an AP, or a chip having an embedded program, which are configured to process data and perform certain operations. Alternatively, the calculation device 330 may include a centralized processing unit (CPU), a graphics processing unit (GPU), a tensor processing unit (TPU), a neural processing unit (NPU), and the like.

The calculation device 330 may generate a control signal. The calculation device 330 may perform calculations required to perform the method for generating the 3D HDR radiance fields.

The calculation device 330 may generate three-dimensional (3D) high dynamic range (HDR) radiance fields from LDR images captured at various viewpoints. The calculation device 330 may generate an HDR image by ray marching on the basis of the 3D HDR radiance fields. The calculation device 330 may generate a tone-mapped LDR image from the HDR image through a tone mapping module. The calculation device 330 may calculate a loss value on the basis of the LDR images captured at the various viewpoints and the tone-mapped LDR image. The calculation device 330 may modify parameters of the 3D HDR radiance fields and parameters of the tone mapping module, so as to maximally minimize the loss value. The calculation device 330 may initialize white balance of the generated HDR image.

The output device 340 may also be a device for outputting predetermined information. The output device 340 may also output an interface required for data processing, input data, an analysis result, and the like. The output device 340 may also be physically implemented in various forms, such as a display, a device for outputting documents, and the like.

The interface device 350 may be a device for receiving predetermined commands and data from the outside. The interface device 350 may receive an input of dialog information from a physically connected input device or an external storage device. The interface device 350 may receive an input of a control signal for controlling the image processing device 300. The interface device 350 may output a result analyzed by the image processing device 300.

The communication device 360 may refer to a component for receiving and transmitting predetermined information through a wired or wireless network. The communication device 360 may receive the control signal required to control the image processing device. The communication device 360 may transmit the result analyzed by the image processing device.

The above-described method for generating the 3D HDR radiance fields may be implemented as a program (or an application) including an algorithm that is executable on a computer.

The above-described program may be stored and provided in a transitory or non-transitory computer readable medium.

The non-transitory computer readable medium is not a medium such as a register, a cache, a memory, and the like for storing short-term data, but is a medium for storing data semi-permanently and readable by a device. Specifically, the various applications or programs described above may be stored and provided in the non-transitory computer readable medium such as a CD, a DVD, a hard disk, a Blu-ray disk, a USB, a memory card, a read-only memory (ROM), a programmable read-only memory (PROM), an Erasable PROM (EPROM) or an Electrically EPROM (EEPROM), or a flash memory.

The transitory computer readable medium refers to various random access memories (RAMs) such as a static RAM (SRAM), a dynamic RAM (DRAM), a synchronous DRAM (SDRAM), a double data rate SDRAM (DDR SDRAM), an augmented type SDRAM (i.e., an Enhanced SDRAM (ESDRAM)), a synchronized DRAM (i.e., a Synclink DRAM (SLDRAM)), and a Direct Rambus RAM (DRRAM).

The present exemplary embodiment and the accompanying drawings in the present specification only clearly show a part of the technical idea included in the above-described technology, and it will be apparent that all modifications and particular exemplary embodiments that can be easily inferred by those skilled in the art within the scope of the technical spirit contained in the specification and drawings of the above-described technology are included in the scope of the above-described technology.

What is claimed is:

1. A method for generating three-dimensional (3D) high dynamic range (HDR) radiance fields, the method comprising:
   receiving, by an image processing device, an input of low dynamic range (LDR) images, which are captured at various viewpoints, as training data;
   constructing, by the image processing device, the 3D HDR radiance fields from the LDR images captured at the various viewpoints;
   generating, by the image processing device, an HDR image by ray marching on a basis of the 3D HDR radiance fields;
   generating, by the image processing device, a tone-mapped LDR image from the HDR image through a tone mapping module configured to adjust a white balance of the HDR image and apply a camera response function, the camera response function corresponding to a relationship between an observation result and radiance of a scene;
   calculating, by the image processing device, a loss value on a basis of the LDR images captured at the various viewpoints and the tone-mapped LDR image; and
   modifying, by the image processing device, parameters of the 3D HDR radiance fields and parameters of a tone-mapping module, so as to maximally minimize the loss value,
   wherein the LDR images captured at the various viewpoints are images captured under photometric conditions different from each other.

2. The method of claim 1, wherein the photometric conditions different from each other comprises at least one of an exposure value, the white balance, and the camera response function of an image capture device.

3. The method of claim 1, wherein the 3D HDR radiance fields are composed of voxels, and
   a vertex located at each corner of the voxels stores spherical harmonic coefficients (SH coefficients) and opacity.

4. The method of claim 3, wherein a color value and opacity of a 3D point on a straight line is determined by performing trilinear interpolation for the spherical harmonic coefficients and opacity of the vertex located at each corner of the voxels.

5. The method of claim 3, wherein the modifying of the parameters comprises:
   modifying the parameters after applying masking to the spherical harmonic coefficients.

6. The method of claim 1, further comprising:
   initializing, by the image processing device, the white balance of the generated HDR image,
   wherein the initializing of the white balance is to set a pixel value of the generated HDR image as a ratio value between an average color value of the generated HDR image and a color value of the generated HDR image.

7. The method of claim 1, wherein the modifying of the parameters comprises:
   modifying parameters of a white balance function on a basis of a reference image.

8. The method of claim 1, wherein the loss value comprises:
   difference values between the tone-mapped LDR image and the LDR images captured at the various viewpoints;
   a value of voxels composed of the 3D HDR radiance fields; and
   a value indicating how appropriate a tone-mapping camera response function is.

9. An image generation method, comprising:
   receiving, by an image processing device, an input of camera location information and camera view angle information; and
   generating, by the image processing device, an HDR image by ray marching on a basis of the camera location information, the camera view angle information, and 3D HDR radiance fields,
   wherein the 3D HDR radiance fields are generated by the method according to claim 1.

10. The image generation method of claim 9, further comprising:
    inputting, by the image processing device, the generated HDR image to the tone-mapping module to generate a tone-mapped LDR image.

11. The image generation method of claim 10, further comprising:
    modifying, by the image processing device, parameter values of the tone-mapping module according to a user's modification request information.

12. An apparatus for generating three-dimensional (3D) high dynamic range (HDR) radiance fields, the apparatus comprising:
    an input device configured to receive an input of low dynamic range (LDR) images, which are captured at various viewpoints, as training data; and
    a calculation device configured to:
    generate the 3D HDR radiance fields from the LDR images captured at the various viewpoints, construct an HDR image by ray marching on a basis of the 3D HDR radiance fields, generate a tone-mapped LDR image from the HDR image through a tone mapping module configured to adjust a white balance of the HDR image and apply a camera response function, the camera response function corresponding to a relationship between an observation result and radiance of a scene, calculate a loss value on a basis of the LDR images captured at the various viewpoints and the tone-mapped LDR image, and modify parameters of the 3D HDR radiance fields and parameters of the tone mapping module, so as to maximally minimize the loss value, wherein the LDR images captured at the various viewpoints are images captured under photometric conditions different from each other, the 3D HDR radiance fields comprise information required for calculating how an object will appear on a screen when the object is viewed from a particular location, and the ray marching determines a pixel value of the HDR image by using a color value and opacity of a 3D point on a straight line when the straight line is drawn in the 3D HDR radiance fields from a particular viewpoint.

13. The apparatus of claim 12, wherein the photometric conditions different from each other comprise at least one of an exposure value, the white balance, and the camera response function of an image capture device.

14. The apparatus of claim 12, wherein the 3D HDR radiance fields are composed of voxels, and a vertex located at each corner of the voxels is to store spherical harmonic coefficients (SH coefficients) and opacity.

15. The apparatus of claim 14, wherein the color value and opacity of the 3D point on the straight line are for being determined by performing trilinear interpolation for the spherical harmonic coefficients and opacity of the vertex located at each corner of the voxels.

16. The apparatus of claim 14, wherein the calculation device configured to modify the parameters comprises:

the calculation device configured to modify the parameters after applying masking to the spherical harmonic coefficients.

17. The apparatus of claim 12, wherein the calculation device is configured to initialize the white balance of the constructed HDR image, and the calculation device is configured to initialize the white balance to set the pixel value of the constructed HDR image as a ratio value between an average color value of the generated HDR image and a color value of the constructed HDR image.

18. The apparatus of claim 12, wherein the calculation device configured to modify the parameters comprises:

the calculation device configured to modify parameters of a white balance function on a basis of a reference image.

19. The apparatus of claim 12, wherein the loss value comprises:

difference values between the tone-mapped LDR image and the LDR images captured at the various viewpoints;

a value of voxels composed of the 3D HDR radiance fields; and a value indicating how appropriate a tone-mapping camera response function is.

* * * * *